United States Patent [19]

Miller et al.

[11] 4,286,509

[45] Sep. 1, 1981

[54] TOASTING APPARATUS

[75] Inventors: Dye O. Miller, South Barrington; August J. Antunes, Elmhurst; Jerome Antunes, Clarendon Hills, all of Ill.

[73] Assignee: A. J. Antunes & Co., Addison, Ill.

[21] Appl. No.: 70,483

[22] Filed: Aug. 28, 1979

[51] Int. Cl.³ .............................................. A47J 27/62
[52] U.S. Cl. ...................................... 99/332; 99/340; 99/386; 99/391; 219/388
[58] Field of Search ................. 99/386, 331, 332, 337, 99/333, 340, 389, 391, 338, 443 C; 219/388; 432/43, 55

[56] References Cited

U.S. PATENT DOCUMENTS

| | | | |
|---|---|---|---|
| 1,696,613 | 12/1928 | Shroyer | 99/386 |
| 1,708,522 | 4/1929 | Pross | 99/337 X |
| 2,151,401 | 3/1939 | Belcher | 99/386 |
| 2,264,611 | 12/1941 | Bemis | 99/333 |
| 3,693,536 | 9/1972 | Carville | 99/386 |
| 4,154,152 | 5/1979 | Lang-Ree | 99/386 |

FOREIGN PATENT DOCUMENTS 1257583 12/1971 United Kingdom .

Primary Examiner—Billy J. Wilhite

Attorney, Agent, or Firm—Mason, Kolehmainen, Rathburn & Wyss

[57] ABSTRACT

An economical energy saving toasting apparatus includes a housing with an interior baffle defining a toasting chamber therein and an inlet for the introduction of the product to be toasted into the chamber. The housing also includes an outlet through which the toasted product is dispensed. A conveying assembly for conveying the product from the inlet through the toasting chamber to the outlet is also included within the housing. Mounted within the toasting chamber is a first set of resistive heating elements that are electrically connected in a circuit and continuously energized during the operation of the heating apparatus. A second set of heating elements is also included in the heating chamber and connected to a timer in order to be energized for only selected periods of time. A micro-switch is also included in the apparatus to actuate the timer and a micro-switch actuator is positioned in the inlet and adjacent to the conveying device so as to be engaged by the product prior to entry into the toasting chamber. The engagement of the product actuates the micro-switch to energize the timer and the second set of heating coils for a predetermined period of time.

16 Claims, 5 Drawing Figures

TOASTING APPARATUS

BACKGROUND OF THE INVENTION

A. Field of the Invention

The present invention relates to a new and improved energy saving device for toasting articles such as bread and the like.

B. Description of the Prior Art

Typical prior art commercial type toasting devices often require connection to a 220 volt source of electrical energy and use 4,200 watts of power. In addition, these prior art toasting devices maintain their heating coils energized for the entire period of operation of the device, thus requiring substantial amounts of energy that is wasted when a product is not being toasted.

Many prior art units also include a large heating or toasting chamber that wastes a substantial amount of energy in order to raise the temperature of the air in the chamber to the desired level and maintain it at that level for the duration of the operation of the apparatus. The heating elements in the typical prior art apparatus are also continuously energized even while toasting an article such as an English muffin of which only one side is desired to be toasted resulting in further waste of energy.

As our natural resources become more scarce with the passage of time, the saving of energy in all areas including appliances is desirable and improvement in appliances of this type is beneficial.

SUMMARY OF THE INVENTION

An object of the present invention is to provide a new and improved apparatus for toasting articles such as bread.

Another object of the present invention is to provide a new and improved energy saving device for toasting articles.

A further object of the present invention is to provide a new and improved toasting apparatus for saving energy through energization of certain heating elements only when necessary to toast the article desired and also by reducing the size of the toasting chamber to require less energy to heat the chamber.

The present invention is directed to a new and improved toasting apparatus that includes a housing with an inner baffle which defines a toasting chamber therein. The housing includes an inlet for the introduction of an article such as bread into the toasting chamber and an outlet for removal of the article after toasting. In addition, the apparatus of the present invention includes a conveying device for automatically conveying the article from the inlet through the toasting chamber and the outlet.

The apparatus of the present invention also includes at least two sets of heating elements mounted in the toasting chamber. One set is continuously energized whereas the second set is only energized for a preselected period of time corresponding to the passage of the article through the toasting chamber. The controlled energization of the second set of heating elements is provided by a micro-switch that controls a timer coupled to the second set of heating elements. The micro-switch includes an actuator that is adjacent to the conveyor assembly and actuated by engagement with the product.

BRIEF DESCRIPTION OF THE DRAWINGS

The above and other objects and advantages and novel features of the present invention will become apparent from the following detailed description of a preferred embodiment of the invention illustrated in the accompanying drawings wherein.

DESCRIPTION OF THE PREFERRED EMBODIMENT

Figure 1:
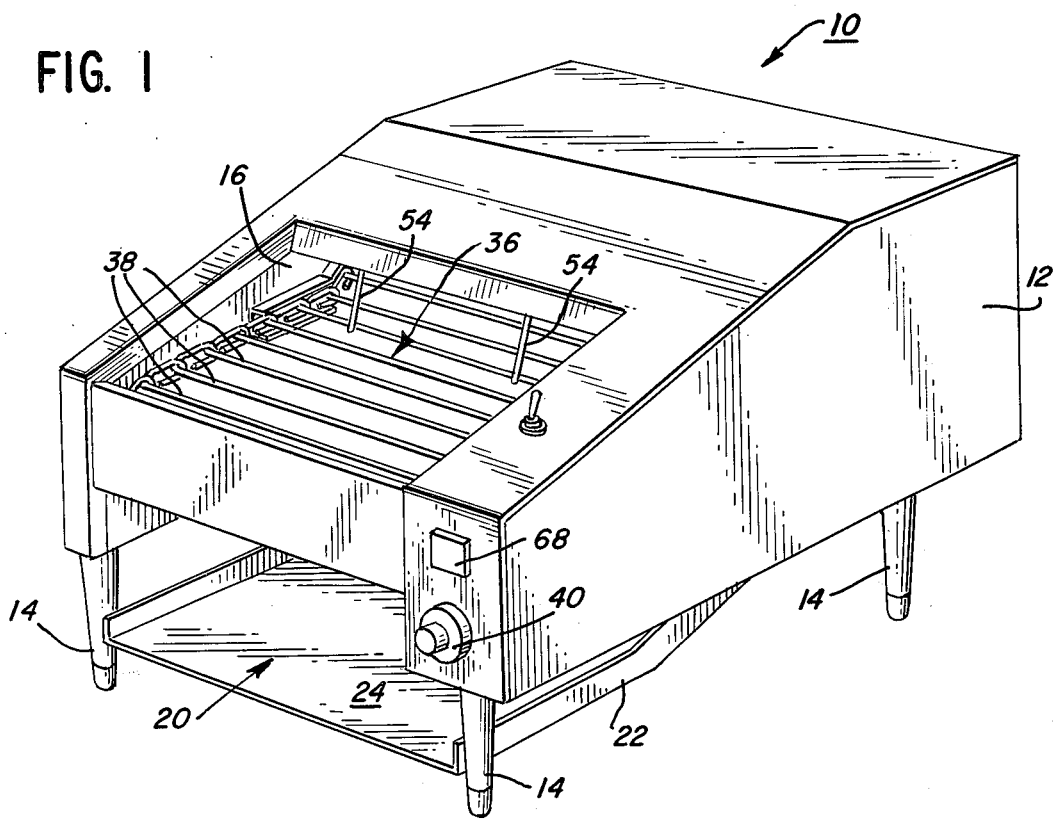
FIG. 1 is a perspective view of a preferred embodiment of a toasting apparatus constructed in accordance with the principles of the present invention.
Figure 3:
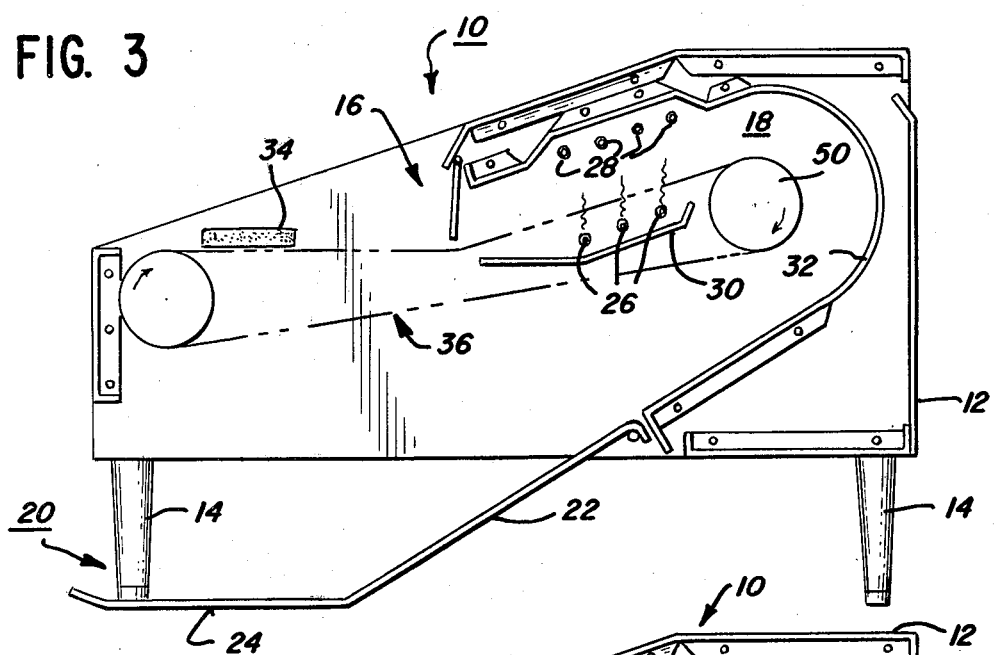
FIG. 3 is a vertical cross-sectional, schematic illustration of the device of the present invention in the mode wherein only one set of heating elements is energized.
Figure 4:
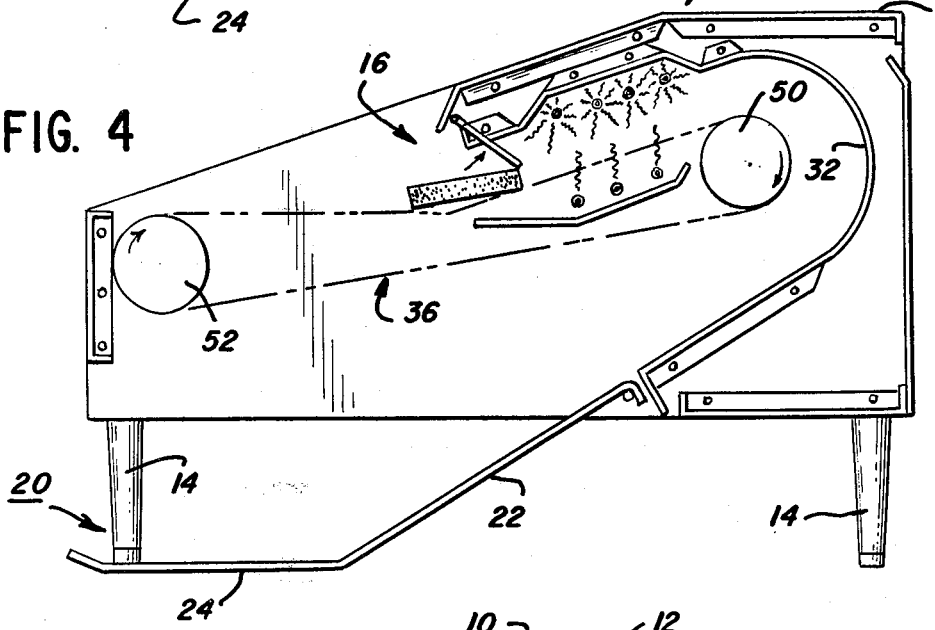
FIG. 4 is a view similar to FIG. 3 with both sets of heating elements energized.
Figure 5:
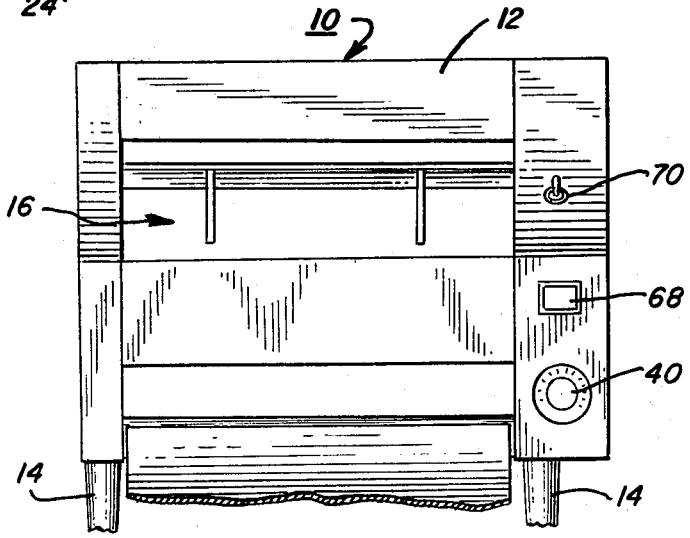
FIG. 5 is a front elevational view of the device of the present invention.

With reference now to the drawings and initially to FIG. 1, there is illustrated a toasting apparatus generally designated by the reference numeral 10. The apparatus 10 is employed to toast articles such as slices of bread, English muffins and the like and is defined by a housing 12 that is mounted on legs or supports 14. An inlet 16 is defined at the front of the housing 12 to allow the introduction of articles into the toasting chamber 18 (FIGS. 3 and 4). In communication with the toasting chamber 18 is an outlet generally designated by the reference numeral 20 and intended to receive the article after it has been toasted. The outlet 20 is in communication with a slide or ramp 22 along which the toasted article slides to a flat or lower portion 24 of the ramp whereupon the article may be manually removed.

Toasting in the toasting chamber 18 is accomplished through the employment of a first or lower set of heating elements 26 mounted in the chamber 18 (FIG. 3) that specifically may be resistive heating elements such as cal-rods. These elements 26 are continuously energized to heat the inner chamber and the air within the chamber 18 to maintain a minimum temperature. A second set of heating elements 28 is also mounted within the toasting chamber 18 and in the preferred embodiment illustrated at a location above the elements 26 (FIG. 4). The second group of elements 28 are also resistive heating elements of the coil or wire type. A reflective shield 30 is mounted within the housing 12 beneath the first set of heating elements 26 to reflect heat upward to assist in the toasting operation.

To minimize the space within the heating chamber 18 and thus minimize the amount of energy needed to heat the air within the chamber to a toasting temperature, a curvilinear baffle 32 is included within the housing 12 that functions to reduce the size of the toasting chamber 18 from that defined by the housing 12 and minimize the amount of air needed to be heated in order to perform the toasting operation. In addition, baffle 32 defines the heating chamber 18 in an upper portion of the inside of the housing 12 to take advantage of the fact that heat rises.

To convey an article such as a piece of bread 34 through the toasting chamber 18, a conveyor generally designated by the reference numeral 36 is mounted within the toasting apparatus 10. The conveyor 36 is defined by a number of links 38 that are looped at their ends to form a chain type arrangement joining the ends of the elements 38 together to form a continuous belt. Article 34 to be toasted is placed on the conveyor 36 adjacent to the opening 16. Thereafter, the apparatus 10 may be actuated by depressing the button 40 on the front panel. The button 40 functions to switch the circuit of the apparatus 10 to the energized mode allowing energizing electricity to flow through the circuit from the outlet plug 42 that is plugged into a source of electrical energy.

Button 40 also actuates a motor (not shown) that includes a first gear 44 that also rotates a second gear 46 through the interaction of a chain 48 extending therebetween. Rotation of the gear 46 is connected to and imparts rotation to a pair of sprockets 50 around which the conveyor 36 is wrapped. A pair of idler sprockets 52 are also rotatably mounted within the housing 12 and the conveyor 36 extends around the idle sprockets 52 to allow continuous belt type rotation of the conveyor 36.

The energy saving feature includes the following elements. The lower heating elements 26 are connected to the source of electrical energy through the cord 42 whenever the conveyor and motor are on. However, the heating elements 28 are electrically connected to a timer 50 and a solenoid 52 and are selectively energized only when necessary. The timer 50 allows or controls the period of time that a solenoid 52 is actuated, such as, for example, sixty seconds, and shuts off the heating elements 28 during that time that an article is not being toasted.

Figure 2:
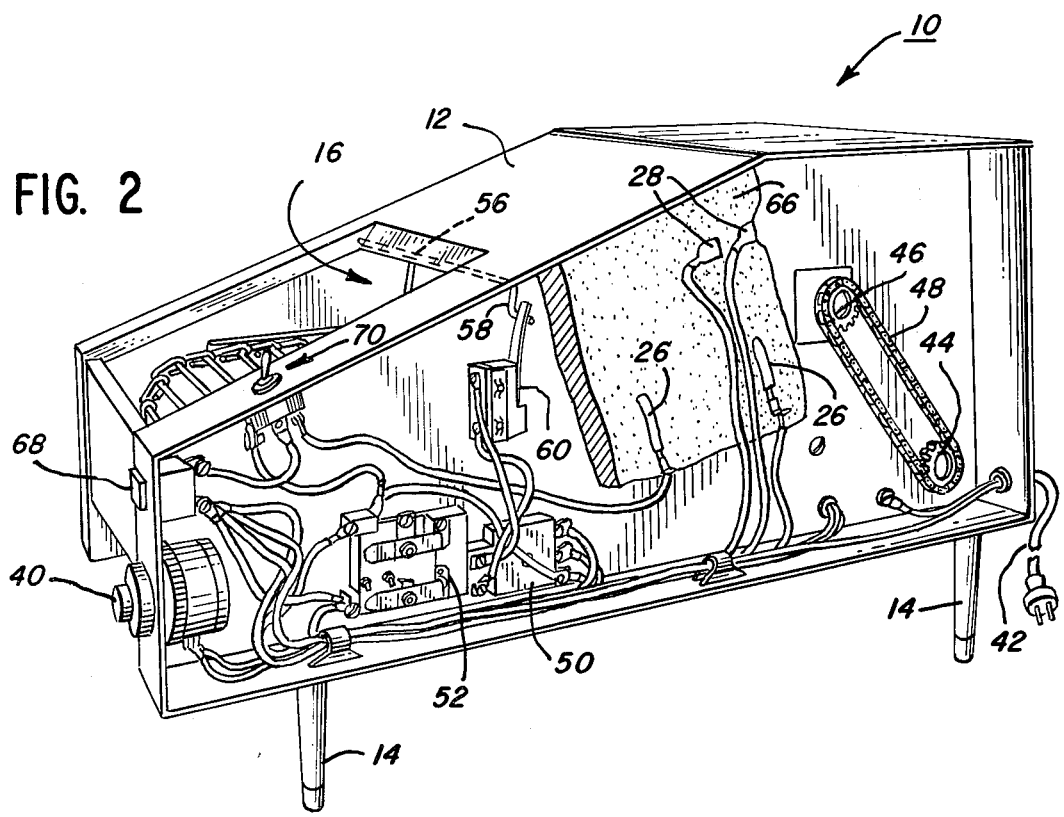
FIG. 2 is a perspective view of the device of the present invention after removal of the right side cover.

To actuate the timer 50 and commence a toasting cycle, a slice of bread 34 is placed on the conveying device 36 and allowed to be moved toward the toasting chamber 18. Upon movement of the article 34 toward the inlet 16, the article 34 engages one or more downward extending actuators or fingers 54 that are pivotally mounted in the housing adjacent the inlet 16. The actuators 54 are connected to a transverse joining bar member 56 that includes an end 58 (FIG. 2) engaging a micro-switch 60. The micro-switch 60 controls the energization of the timer 50. As best illustrated in FIG. 2, upon engagement of the article 34 to be toasted with the depending actuator fingers 54, the member 56 is pivoted actuating the micro-switch 60 and energizing the timer 50 for a predetermined period of time. The timer 50 in turns energizes the solenoid 52 which energizes the heating elements 28 for the predetermined period of time that in the preferred embodiment is sixty seconds. This period corresponds to the amount of time necessary to toast the article 34 passing through the chamber 18 whereupon the heating elements 28 are deenergized and the toasted article 34 continues on the conveyor 36 until passing over the roller 50 and drops down onto the slide 22 to the portion 24. If several articles 34 are to be toasted, each article engages the depending actuator 54 thereby resetting the timer 50. The coils 28 will then remain energized until the last article 34 to be toasted passes through the toasting chamber 18. As can be understood, since the coils 28 are only energized when necessary to toast an article, substantial energy is saved.

In order to avoid the necessity of substantial energy being required to raise the temperature in chamber 18 upon the introduction of the first article 34, the coils 26 are continuously operated and maintain the toasting chamber 18 at an elevated temperature such that toasting temperature can be rapidly reached once the elements 28 are energized thus eliminating the need for a larger toasting chamber 18. To further conserve energy, the toasting chamber 18 is reduced in size from that defined by the housing 12 by the baffle 32 mounted within the housing 12 and encircling the roller 50. The baffle 32, as previously described, conserves energy since the reduction of the size of the heating chamber provides a smaller amount of air that must be heated to elevate the temperature of the toasting chamber 18 to the desired level. In addition, insulation 66 is wrapped around the toasting chamber 18. These features along within the timed energization of the elements 28 reduce the energy requirements of the apparatus 10 and allow it to require a 110 volt source of energy as opposed to 220 volts as required by many of the prior art devices.

As a safety feature, a light 68 is included on the front of the housing 12 and is connected to the circuit of the apparatus 10 so as to light when the heating elements 26 and 28 are energized thus alerting the user of the apparatus 10 of its energized state.

One of the other uses of the apparatus 10 is to toast only one side of the article 34 such as an English muffin. This is accomplished through the use of the toggle switch 70. In a one position of the switch 70, the heating elements 26 are deenergized and the upper heating elements 28 are energized continuously thereby overriding the micro-switch 60 and allowing articles 34 to be toasted only on the upper surface. Consequently, in this mode the depending actuators 54 do not actuate the micro-switch 60. In a second position of the switch 70, the apparatus 10 operates in the manner described previously.

Many modifications and variations of the present invention are possible in light of the above teachings. Thus, it is to be understood that, within the scope of the appended claims, the invention may be practiced other than as specifically described above.

What is claimed and desired to be secured by Letters Patent of the United States is:

1. A toasting apparatus comprising
   a housing defining a toasting chamber,
   a first opening defined in said housing for the introduction of a product into said toasting chamber,
   a second opening defined in said housing for the removal of said product after toasting,
   means for conveying said product from said first opening to said second opening,
   first heating means in said chamber, said first heating means being continuously energized,
   second heating means in said chamber, and first switch means mounted adjacent said conveying means so as to be engaged by said product to energize said second heating means for a predetermined period of time.

2. The toasting apparatus set forth in claim 1 wherein said first switch means includes a timer for controlling the time said second heating means is energized.

3. The toasting apparatus set forth in claim 1 wherein said first and second heating means each includes at least one resistive heating element.

4. The toasting apparatus set forth in claim 1 further comprising a baffle surrounding said conveying means and said first and second heating means to define said toasting chamber within and smaller than said housing.

5. The toasting apparatus set forth in claim 1 wherein said first switch means includes a microswitch with a microswitch actuator adjacent to said conveying means for engagement with said product.

6. The toasting apparatus set forth in claim 1 further comprising second switch means for deenergizing said first heating means and continuously energizing said second heating means.

7. An apparatus for toasting articles comprising
a housing,
a baffle mounted in said housing defining a reduced toasting chamber,
first and second sets of heating elements mounted in said toasting chamber, and
means for controlling the period of energization of said first set of heating elements, said controlling means including article sensing means for sensing the entry of an article into said toasting chamber.

8. The apparatus claimed in claim 7 further comprising means for conveying said articles into said toasting chamber.

9. The apparatus claimed in claim 7 further comprising switch means for deenergizing said second set of heating elements and continuously energizing said first set of heating elements.

10. The apparatus claimed in claim 7 wherein said first set of heating elements includes at least one coil type resistive heating element and said second set of heating elements includes at least one cal rod type resistive heating element.

11. The apparatus claimed in claim 7 wherein said controlling means includes a micro-switch actuated by said article sensing means, and a timer actuated for a preselected period of time by said micro-switch, said timer being electrically connected to said first set of heating elements.

12. An energy efficient toasting apparatus, comprising:

a housing defining an elevated, generally closed toasting chamber for minimizing heat loss and maximizing efficiency;
means for conveying an article to be toasted through said toasting chamber, said conveying means moving said article upwardly into the toasting chamber;
means for heating said chamber to a temperature to toast said article; said heating means including first and second sets of resistive heating type elements,
first switch means for energizing said heating means for a preselected period of time;
switch actuating means for actuating said switch means upon engagement of said article with said switch actuating means; and
second switch means for continuously energizing said first set of resistive heating type elements and deenergizing said second set of resistive heating type elements.

13. The apparatus claimed in claim 12 wherein said conveying means comprises a continuous conveyor belt.

14. The apparatus claimed in claim 12 wherein said first set of resistive heating type elements are controlled by said switch means.

15. The apparatus claimed in claim 12 wherein said first set of resistive heating type elements are mounted on an upper portion of said toasting chamber.

16. The apparatus claimed in claim 12 wherein said first switch actuating means comprises article engagement members adjacent said toasting chamber and engaged by said article as said article enters said toasting chamber.

* * * * *